United States Patent [19]

Paduch et al.

[11] 4,273,150
[45] Jun. 16, 1981

[54] LEVERLESS PRESSURE TRANSDUCER

[75] Inventors: Stanley R. Paduch, Somers; Robert K. Olson, Bloomfield, both of Conn.

[73] Assignee: United Technologies Corporation, Hartford, Conn.

[21] Appl. No.: 97,585

[22] Filed: Nov. 26, 1979

[51] Int. Cl.³ .......................................... G05D 16/00
[52] U.S. Cl. .................................... 137/85; 137/508
[58] Field of Search ................ 137/85, 82, 86, 84, 137/508

[56] References Cited

U.S. PATENT DOCUMENTS

| 2,538,436 | 1/1951 | Weinberg | 137/508 X |
| 2,912,993 | 11/1959 | Jones | 137/82 X |
| 3,124,147 | 3/1964 | Hallett | 137/86 |
| 3,163,981 | 1/1965 | Goodall | 137/85 X |

FOREIGN PATENT DOCUMENTS 567890 1/1933 Fed. Rep. of Germany .......... 137/505

Primary Examiner—Alan Cohan
Attorney, Agent, or Firm—Charles A. Warren

[57] ABSTRACT

A temperature or pressure sensor that produces a hydraulic pressure signal proportional to temperature or pressure. The sensor or transducer utilizes a plurality of bellows acting on a valve nozzle plate so that the temperature signal which is a gas pressure moves the nozzle plate to control the flow through the nozzle as a function of temperature thus producing a metered pressure proportional to temperature. The bellows are arranged to minimize temperature error in the transducer. Where the temperature sensed is engine inlet temperature the metered pressure may be used to control the fuel through the turbine engine as a function of the engine inlet temperature. This same device is equally utilized in measuring a pressure, such as compressor discharge pressure.

9 Claims, 1 Drawing Figure

U.S. Patent    Jun. 16, 1981    4,273,150
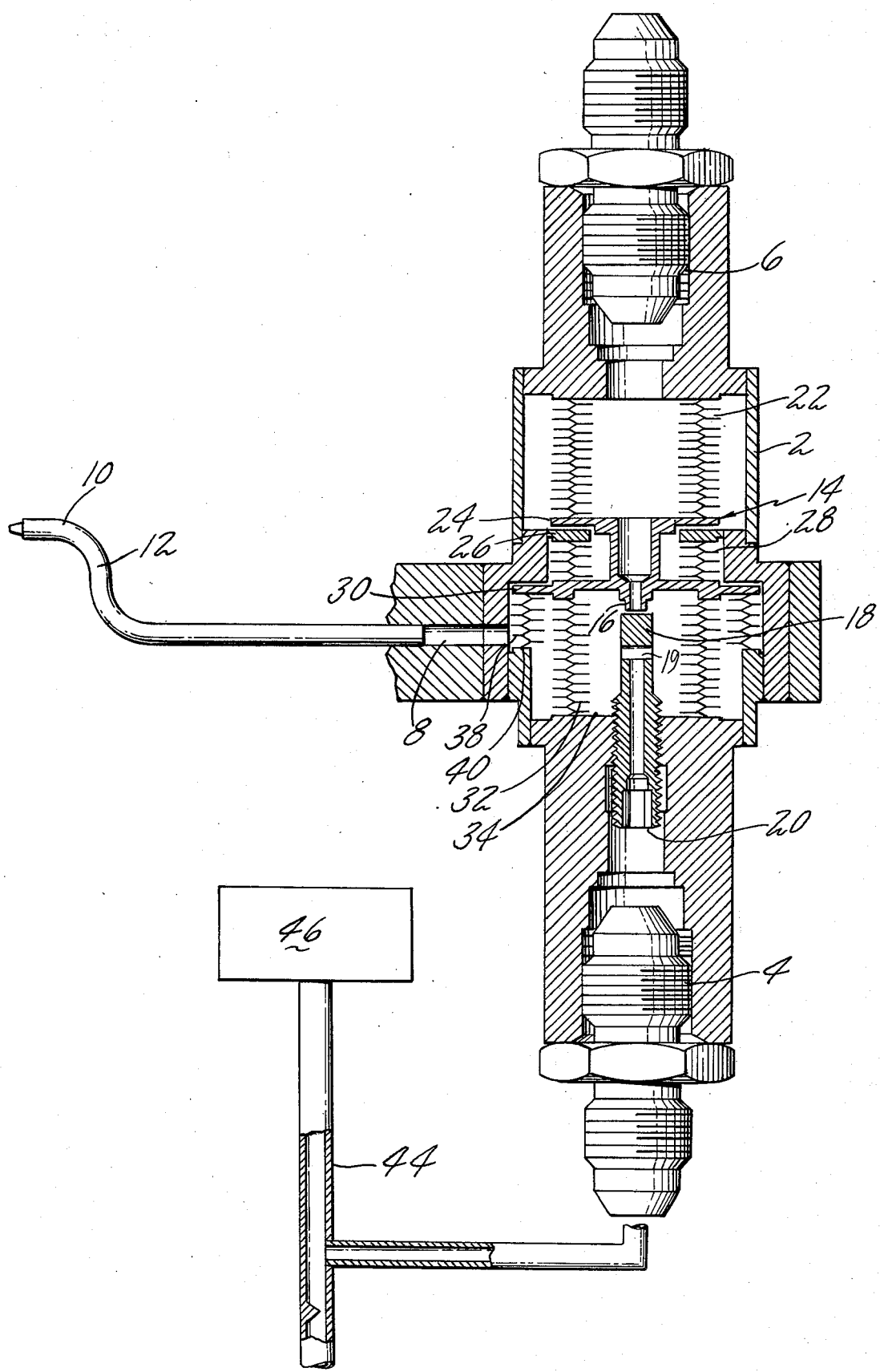

LEVERLESS PRESSURE TRANSDUCER

BACKGROUND OF THE INVENTION

Many temperature sensors require levers or actuating rods, bearings, adjustment links and/or pivots and seals all of which are expensive and subject to wear or malfunction. A sensor that could produce a pressure signal proportional to temperature that would be simple, reliable and light in weight and avoid the complications of such mechanical elements as links, pivots and the like is a desirable device that could serve as a pressure transducer, for example, in a fuel control system.

The present invention is in some respects an improvement on the copending application of Lawsing Ser. No. 97,584 filed Nov. 26, 1979 having the same assignee as the present application.

SUMMARY OF THE INVENTION

One feature of the invention is a bellows assembly directly connected to and actuating a floating nozzle plate making the device free of levers, links and/or friction causing elements. Another feature is a simplified form of adjustment of the device for different hydraulic pressures and also for a simplified rate adjustment. Another feature is a bellows arrangement to minimize the influence of the varying temperatures of the control liquid and also to minimize signal errors resulting from any changes. The device also positions the gas pressure sensing bellows in surrounding relation to one of the other bellows, thereby providing for a more compact device.

According to the invention a change in temperature causes a change in gas pressure in the probe or transducer and this pressure is sensed by bellows acting on a nozzle valve plate that is supported and guided by the bellows and is movable toward and away from a valve stop by pressure changes in order to control the flow rate through the nozzle and thus control the pressure of a hydraulic fluid at the nozzle. The bellows are arranged so that the outsides of the bellows are evacuated so that ambient temperatures or the temperature of the transducer casing will have a minimum effect on the accuracy of the device. The gas sensing bellows is also positioned around one of the hydraulic pressure sensing bellows so that a more compact device will result, and these two bellows are insulated by an evacuated chamber therebetween.

BRIEF DESCRIPTION OF THE DRAWING

FIG. 1 is a sectional view through the device.

DESCRIPTION OF THE PREFERRED EMBODIMENT

The transducer has a T-shaped casing 2 having an inlet 4 for metered hydraulic fluid at one end and an outlet 6 for drain at the opposite end. The stem of the T has a gas pressure inlet 8 which is connected to a pressure source or a temperature sensor 10 consisting of a gas filled probe or tube 10 by a conduit 12. The change in temperature at 10 causes a change in gas pressure in the probe and this pressure is transmitted through the conduit 12 to the transducer.

Within the casing 2 is a spool shaped flapper valve plate 14 having a nozzle 16 therein in a position to engage the end of an adjustable screw forming a valve stop 18 positioned in the hydraulic fluid inlet 4. This screw is hollow from the inlet end to a cross passage 19 and presents a solid inner end that more or less closes the nozzle dependent upon the spacing of the nozzle. The screw is threaded within the inlet and is adjustable by insertion of a key into the inlet to engage a hexagonal recess 20 at the inlet end of the screw.

The nozzle is supported within the casing by a plurality of bellows. The bellows 22 adjacent the hydraulic fluid outlet is filled with the hydraulic fluid and the outside of the bellows is evacuated. The inner end of the bellows is secured to the upper annular flange 24 of the nozzle plate 16. Below the flange 24 is a ring 26 secured to the casing in spaced relation to the flange and a bellows 28 extends between this ring 26 and the lower annular flange 30 of the nozzle plate. The outside of this bellows is exposed to gas pressure from the temperature probe and the inside is evacuated.

Below the lower annular flange 30 is a bellows 32 extending between said flange and a surface 34 on the casing surrounding the inlet 4. The space within the bellows is filled with metered hydraulic fluid upstream of the nozzle and the space outside the bellows is evacuated. This bellows 32 and the bellows 22 above described are similar in diameter.

Surrounding the bellows 26 is a larger diameter bellows 38, extending between the lower flange 30 and an annular surface 40 on the casing below the gas pressure inlet. Thus the space outside this bellows is filled with gas from the gas inlet as is the space around the bellows 28. With this arrangement the force transmitted to the nozzle plate by the gas is equal to the gas pressure times the difference in the mean effective areas of bellows 28 and 38, this force acting to move the nozzle toward or away from the valve stop. This force is opposed by the force exerted on the plate from the difference in metered hydraulic fluid pressure and drain pressure times the effective area of the bellows 22 since both bellows 22 and 32 are filled with this fluid.

With this arrangement a change in gas pressure caused by a temperature change at the probe will cause a force change on the nozzle plate with the result that it will move toward or away from the adjusting screw resulting in a change in metered hydraulic pressure proportional to the change in the gas pressure entering the transducer. When the device is used in connection with a fuel control in a gas turbine engine, an increase in the engine inlet temperature as sensed by the probe located at the inlet, will result in an increased metered hydraulic fluid pressure signal proportional to the temperature change and this metered hydraulic pressure signal will reach the appropriate servo operated linkage in the fuel control. When the device is used in this way the hydraulic fluid in the transducer will usually be fuel.

The device may be connected as shown. The sensing line 12, in which the pressure is proportional to the temperature sensed by the probe enters the space around the bellows 28 and the bellows 38. The hydraulic fluid inlet 4 is connected to duct 42 from pressure fluid conduit 44. One end of this conduit 44 is connected to the mechanism to be controlled such as, for example, the fuel valve 46 for the engine for which the probe is sensing a particular temperature. The fluid inlet end of conduit is connected to a source of fluid under pressure, not shown, which may be the fuel supply to the engine. This inlet has an orifice 48 upstream of the duct 42 so that movement of the nozzle plate 14 will maintain a metered fluid pressure in duct 42 and in conduit 44 downstream of the orifice 48 that is proportional to the sensed temperature. As above stated, the pressure in duct 12 is proportional to the sensed temperature and this provides proportional pressure changes in duct 42 and at the fuel valve 46.

This device thus provides a hydraulic pressure signal proportional to temperature with a valve operated directly by the sensing bellows. Rate adjustment may be obtained by adjusting the charged gas pressure in the probe and position adjustment is accomplished by adjustment of the valve screw element 18 within the metered pressure inlet. The operation is simplified by making the fluid passages within the screw. The design of the valve permits maximum tolerance for misalignment of parts as will be apparent.

The arrangement of the bellows places evacuated chambers between the hydraulic fluid bellows and the gas bellows to reduce the heat conductive path between the fluids to minimize the influence of hydraulic fluid temperature changes. The gas volume in the gas sensing bellows is minimized to reduce signal errors due to ambient or hydraulic fuel temperature changes. When the device is used in fuel controls the arrangement and sizing of the bellows is such that the metered hydraulic fluid signal will be sufficient to cause the main control linkage of the control to achieve a fail-safe scheduled position in the event of failure of the probe.

The hydraulic fluid supply to the transducer is metered so that by changing the flow through the nozzle 16, there will be a change in the metered fuel pressure at the inlet 4. The device is arranged so that an increase of the signal pressure will move the valve plate 14 to reduce the flow through the nozzle 16 thereby increasing the metered fuel pressure in an amount proportional to the signal pressure. As the device is arranged, changes in the hydraulic fluid temperature have a minimum of effect on the accuracy of the device since the bellows subject to the hydraulic fluid are insulated from the casing and from the signal pressure bellows. Although not previously stated it will be understood that the ends of the bellows are all secured to the surface with which they engage. The arrangement is particularly advantageous in that the flapper valve plate is freely movable toward and away from the valve stop without frictional contact at any point. The bellows are the sole support for this movable plate. It may be noted that this device also requires no mechanical spring to bias the movable plate. The pressures acting on the bellows provide the necessary pressures on the plate.

Although the device has been described primarily as a temperature sensor in which the gas pressure entering the transducer is a function of temperature, it will be obvious that the device would equally be applicable for the measurement of gas pressures directly as by connecting a pressure sensing probe located, for example, in the compressor discharge of the gas turbine engine with the gas pressure inlet of the device.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A pressure transduer including:
    a casing having a hydraulic fluid inlet and outlet and a gas pressure inlet;
    a movable valve plate in said casing between the fluid inlet and outlet having a nozzle therein;
    a valve element in said casing in a position to be engaged by said plate to more or less close said nozzle;
    a plurality of bellows connected to and supporting said plate for movement toward and away from said valve element; and
    means for exposing one side of one bellows to gas from the gas pressure inlet and for exposing one side of each of two bellows to the hydraulic fluid pressure on opposite sides of the nozzle plate, the bellows exposed to the gas being larger than and surrounding one of the bellows exposed to the hydraulic fluid pressure and the space between these bellows being evacuated.

2. A pressure transducer as in claim 1 in which the valve element is threaded in the casing for adjustment.

3. A pressure transducer as in claim 1 in which the valve element has flow passages therein for flow of fluid from the fluid inlet.

4. A pressure transducer as in claim 1 in which the end of the valve is flat and in alignment with the nozzle in the plate.

5. A pressure transducer as in claim 1 in which the nozzle plate has opposed bellows at opposite sides thereof with the interiors of the bellows exposed to the fluid pressures on opposite sides of the plate.

6. A pressure transducer as in claim 5 in which the spaces surrounding said opposed bellows are evacuated.

7. A pressure sensing transducer including:
    a casing having a fluid inlet and a fluid outlet for a control fluid and a gas inlet for the controlling gas pressure;
    a valve in said casing between the fluid inlet and outlet and comprising a valve element having a passage therein for the fluid entering the casing and having a flat inner end and a movable valve plate having a passage therein in alignment with the flat inner end of the valve element; and
    opposed bellows on opposite sides of the plate and supporting the plate in the casing, the insides of the bellows being exposed to the fluid pressure on opposite sides of the plate, the spaces surrounding these bellows being evacuated and other bellows also between the plate and the casing having their outsides exposed to gas from the inlet.

8. A pressure sensing transducer as in claim 7 in which one of said other bellows surrounds one of said opposed bellows, the spaces within said other bellows being evacuated.

9. A pressure transducer as in clam 7 in which the valve element is threaded in the fluid inlet for adjustment.

* * * * *